United States Patent
Nochi et al.

(10) Patent No.: US 8,871,665 B2
(45) Date of Patent: Oct. 28, 2014

(54) METHOD OF REGENERATING $NO_x$ REMOVAL CATALYST AND METHOD OF OPERATING HEAVY-OIL FIRED COMBUSTION APPARATUS

(75) Inventors: Katsumi Nochi, Tokyo (JP); Masashi Kiyosawa, Tokyo (JP); Hideo Miyanishi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 181 days.

(21) Appl. No.: 13/570,971

(22) Filed: Aug. 9, 2012

(65) Prior Publication Data

US 2013/0047903 A1 Feb. 28, 2013

Related U.S. Application Data

(60) Provisional application No. 61/529,615, filed on Aug. 31, 2011.

(30) Foreign Application Priority Data

Aug. 31, 2011 (JP) .................... 2011-188828

(51) Int. Cl.
*B01J 21/20* (2006.01)
*B01J 23/90* (2006.01)
(Continued)

(52) U.S. Cl.
CPC *F23J 15/02* (2013.01); *B01J 38/60* (2013.01); *B01J 23/22* (2013.01); *B01D 2251/2062*
(Continued)

(58) Field of Classification Search
CPC .................... F23J 15/02; F23J 2219/10; F23J 2900/11001; B01J 38/04; B01J 38/60; B01J 38/62; B01J 23/22; B01J 23/28; B01J 23/30; B01J 23/92; B01D 53/8628; B01D 2258/0283; F23N 2025/10; F23N 2037/20
USPC .................................... 502/20, 27, 28, 34, 56
See application file for complete search history.

(56) References Cited

U.S. PATENT DOCUMENTS 2,391,327 A * 12/1945 Mekler ........................ 502/52
2010/0292070 A1* 11/2010 Obayashi et al. ............... 502/21

(Continued)

FOREIGN PATENT DOCUMENTS

| JP | 60-38037 A | 2/1985 |
| JP | 3059136 B2 | 7/2000 |

(Continued)

OTHER PUBLICATIONS

Shigeru Nojima et al. "Development of Nox Removal SCR Catalyst for Low SO2 Oxidation" Mitsubishi Heavy Industries, Ltd. Technical Review vol. 38 No. 2 (Jun. 2001) pp. 87-91 English translation.

*Primary Examiner* — Jennifer A Smith
(74) *Attorney, Agent, or Firm* — Westerman, Hattori, Daniels & Adrian, LLP

(57) ABSTRACT

The method includes a pretreatment step during an operation of a boiler in which in a predetermined period of time before shutdown of the boiler, a part of combustion gas that has bypassed an economizer provided in a flue gas duct for flue gas from the boiler is supplied to an upstream of a $NO_x$ removal device having a $NO_x$ removal catalyst and mixed with the combustion flue gas from the economizer to generate mixed gas having a predetermined temperature equal to or higher than 360° C. (360° C. to 450° C.), the mixed gas is introduced into the $NO_x$ removal catalyst, thereby decomposing $VOSO_4$ adhering to and accumulating on the $NO_x$ removal catalyst into $V_2O_5$.

8 Claims, 6 Drawing Sheets

(51) Int. Cl.
  *B01J 25/04*   (2006.01)
  *B01J 27/28*   (2006.01)
  *B01J 29/90*   (2006.01)
  *B01J 31/40*   (2006.01)
  *B01J 38/00*   (2006.01)
  *B01J 38/60*   (2006.01)
  *B01J 38/62*   (2006.01)
  *B01J 38/04*   (2006.01)
  *B01J 38/02*   (2006.01)
  *B01J 23/22*   (2006.01)
  *B01J 23/28*   (2006.01)
  *B01J 23/30*   (2006.01)
  *B01D 53/86*   (2006.01)
  *F23J 15/02*   (2006.01)
  *B01J 23/92*   (2006.01)

(52) U.S. Cl.
  CPC ......... (2013.01); *B01J 38/04* (2013.01); *B01J 23/28* (2013.01); *B01D 2255/20707* (2013.01); *B01D 2258/0283* (2013.01); *F23J 2219/10* (2013.01); *B01D 2255/20769* (2013.01); *F23N 2025/10* (2013.01); *B01J 23/30* (2013.01); *F23N 2037/20* (2013.01); *B01D 53/8628* (2013.01); *B01D 2255/20776* (2013.01); *B01D 2255/20723* (2013.01); *B01J 23/92* (2013.01); *F23J 2215/10* (2013.01); *F23J 2900/11001* (2013.01); *B01D 2257/404* (2013.01); *B01J 38/62* (2013.01)
  USPC .................. 502/27; 502/28; 502/20; 502/34; 502/56

(56) References Cited

U.S. PATENT DOCUMENTS

| | | | |
|---|---|---|---|
| 2012/0204543 A1* | 8/2012 | Obayashi et al. | 60/274 |
| 2013/0047903 A1* | 2/2013 | Nochi et al. | 110/345 |
| 2014/0080695 A1* | 3/2014 | Nochi et al. | 502/25 |

FOREIGN PATENT DOCUMENTS

| | | | |
|---|---|---|---|
| JP | 3059137 B2 | 7/2000 |
| JP | 3224708 B2 | 11/2001 |
| JP | 2001-340764 A | 12/2001 |
| JP | 2005-126317 A | 5/2005 |
| JP | 2005-185928 A | 7/2005 |
| JP | 4436124 B2 | 3/2010 |

* cited by examiner (a) INITIAL STAGE (b) AFTER 14400 HOURS

X-RAY DIFFRACTION ANALYSIS RESULT OF CATALYST UNDER DURABILITY TEST (OPERATED FOR 14,400 HOURS)

VARIATION WITH TIME IN VANADIUM DEPOSIT IN ACTUAL DEVICE

RELATION BETWEEN $V_2O_5$ CONCENTRATION AND $SO_2$ OXIDATION RATE OF CATALYST IN ACTUAL DEVICE

METHOD OF REGENERATING NO$_x$ REMOVAL CATALYST AND METHOD OF OPERATING HEAVY-OIL FIRED COMBUSTION APPARATUS

FIELD

The present invention relates to a method of regenerating a NO$_x$ removal catalyst of a NO$_x$ removal device that performs flue-gas treatment in a heavy-oil fired combustion apparatus and a method of operating a heavy-oil fired combustion apparatus.

BACKGROUND

As a method of removing nitrogen oxide (NO$_x$) in flue gas discharged from a combustion apparatus such as a boiler, an ammonia catalytic reduction method has been put into practical use, in which ammonia (NH$_3$) is used as a reduction agent to decompose NO$_x$ to nitrogen and water, which are harmless to the environment, in the presence of a nitrogen oxide removal catalyst (hereinafter, "NO$_x$ removal catalyst").

In the treatment of flue gas from a boiler that uses heavy oil such as fuel oil C with a high sulfur (S) content as a fuel, sulfur dioxide (SO$_2$) with a high concentration is present in flue gas. Therefore, oxidation reaction of sulfur dioxide (SO$_2$) into sulfur trioxide (SO$_3$), which occurs simultaneously with reduction and removal reaction of a NO$_x$ removal catalyst, produces sulfur trioxide (SO$_3$) with a high concentration. The sulfur trioxide (SO$_3$) with a high concentration is easily bound to an unreacted portion of NH$_3$, which is used as a reduction agent, in a low temperature region to form acid ammonium sulfate and other compounds, and thus clogging or partial blockages to the interior and piping of various devices such as a heat exchanger in a downstream or the like, thereby increasing a pressure loss. Accordingly, a measure such as performance upgrading of a precipitator needs to be taken.

Furthermore, as a catalyst exhibiting an excellent NO$_x$ removal performance and a low SO$_2$ oxidation capability, a type of catalyst having tungsten oxide, vanadium-tungsten oxide or the like supported on titania is available.

Ultraheavy oil, such as Orimulsion (for an oil-in-water type emulsion produced by mixing Orinoco tar, which is ultraheavy oil collected in Orinoco State, Venezuela, with water and a surfactant for easy handling at a normal temperature; trade name of Mitsubishi Corporation), asphalt, and vacuum residual oil (VRO), contains two to three times as much sulfur (S), and five to seven times as much vanadium (V) as in fuel oil C, as shown in Table 1 disclosed in the Patent Literature mentioned below. Furthermore, because the SO$_2$ concentration in flue gas of such ultraheavy oil is very high, there is a problem that a vanadium compound becomes deposited on a surface of the NO$_x$ removal catalyst during an operation.

Particularly, it has been confirmed that when a low grade fuel with a sulfur (S) content of 1% by weight or more is used, this tendency is noticeable.

TABLE 1

| Measurement item | Orimulsion | Orinoco oil | Fuel oil C |
|---|---|---|---|
| Specific gravity (80° C./4° C.) | — | 0.976 | 0.889 |
| Viscosity (cSt) (80° C.) | — | 1528 | 34.8 |

TABLE 1-continued

| Measurement item | Orimulsion | Orinoco oil | Fuel oil C |
|---|---|---|---|
| N (wt %) | 0.48 | 0.63 | 0.22 |
| S (wt %) | 2.78 | 3.79 | 0.97 |
| Water content (wt %) | 28 to 30 | <0.1 | <0.1 |
| Higher calorific power (kJ/kg) [kcal/kg] | About 29400 [about 7000] | About 42000 [about 10000] | 43680 [10400] |
| Ash content (wt %) | 0.08 | 0.13 | 0.01 |
| Carbon residue (wt %) | 11.89 | 17.4 | 8.0 |
| V (ppm) | 280 to 350 | 400 to 500 | 50 or less |
| Na (ppm) | 40 to 70 | 60 to 100 | — |

(Reference) The Thermal and Nuclear Power, Vol. 465, June 1995

FIG. 5 is a graph of an X-ray diffraction analysis result of a NO$_x$ removal catalyst after being operated for 14,400 hours. FIG. 6 is a graph of a relation between a boiler operating time and an increased amount of vanadium pentoxide (V$_2$O$_5$) in an entire catalyst. FIG. 7 is a graph of a relation between a concentration increase of vanadium pentoxide (V$_2$O$_5$) and an SO$_2$ oxidation rate (Non Patent Literature 1). Here, "a.u." in FIGS. 5, 6, and 7 represents a ratio to a reference value, and is not an absolute value.

As shown in FIG. 5, in the X-ray diffraction analysis result in an initial stage of an operation, only titania (TiO) of the catalyst component was produced. However, in the X-ray diffraction analysis result after being operated for 14,400 hours, it was confirmed that vanadyl sulfate (VOSO$_4$) and vanadium pentoxide (V$_2$O$_5$) were produced in the NO$_x$ removal catalyst. As shown in FIG. 6, it was confirmed that the concentration of vanadium pentoxide (V$_2$O$_5$) is increased over the course of operating hours.

The vanadium is an active component of the NO$_x$ removal catalyst and is a substance that promotes SO$_2$ oxidation reaction as a side reaction. As shown in FIG. 7, in an actual device, there is such a problem that the SO$_2$ oxidation reaction rate is increased with time, and as a result, the amount of corrosive SO$_3$ discharged to a downstream side of the NO$_x$ removal device is increased.

In catalyst regeneration treatment for regenerating a NO$_x$ removal catalyst at the time of an inspection, therefore, the present inventors have proposed a technique for regenerating a NO$_x$ removal catalyst in which after the NO$_x$ removal catalyst is first taken out from a NO$_x$ removal device, the NO$_x$ removal catalyst is then heated under a high temperature condition of, for example, from 450° C. to 600° C. in an electric furnace, vanadyl sulfate (VOSO$_4$) is decomposed into vanadium pentoxide (V$_2$O$_5$), and thereafter the heated NO$_x$ removal catalyst is subjected to oxalic acid washing using oxalic acid, thereby dissolving and removing vanadium pentoxide (V$_2$O$_5$), and a technique for decomposing vanadyl sulfate (VOSO$_4$) under a high temperature condition by using sulfuric acid or the like (Patent Literature 1).

CITATION LIST

Patent Literature

Patent Literature 1: Japanese Patent Application Laid-open No. 2005-185928

Non Patent Literature

Non Patent Literature 1: Mitsubishi Heavy Industries Technical Review Vol. 38, No. 1 (2001-1)

SUMMARY

Technical Problem

However, in the method of regenerating a $NO_x$ removal catalyst disclosed in Patent Literature 1, at the time of heating the $NO_x$ removal catalyst by using the electric furnace under a high temperature condition (for example, from 450° C. to 600° C.), there is a problem that a reaction in the following formula (1) proceeds, and sulfur dioxide ($SO_2$) and sulfur trioxide ($SO_3$) are produced in the electric furnace.

$$2VOSO_4 \rightarrow V_2O_5 + SO_2 + SO_3 \tag{1}$$

Therefore, in the catalyst regeneration method according to Patent Literature 1, at the time of performing high-temperature heating treatment in the electric furnace, there is a problem that a desulfurizer is separately required as a treatment facility of sulfur oxide ($SO_x$).

Further, to decompose vanadyl sulfate ($VOSO_4$) only by acid treatment, it is required to set the acid concentration to 3 to 12 Normal and to perform the treatment under a severe condition such as a temperature of 60° C. to 90° C., and thus the environment of the treatment facility becomes degraded.

Therefore, the emergence of a method of regenerating a $NO_x$ removal catalyst that can facilitate regeneration of the $NO_x$ removal catalyst has been strongly desired.

Solution to Problem

The present invention has been achieved to solve the above problems, and an object of the present invention is to provide a method of regenerating a $NO_x$ removal catalyst and a method of operating a heavy-oil fired combustion apparatus.

Solution to Problem

According to an aspect of the present invention, in a method of regenerating a $NO_x$ removal catalyst for removing nitrogen oxide in flue gas at a time of combustion in a boiler by using heavy oil, in a predetermined period of time before shutdown of a boiler, a decomposing step is performed during an operation of the boiler, at which a part of combustion gas that has bypassed an economizer provided in a flue gas duct for flue gas from the boiler is supplied to an upstream of a $NO_x$ removal device having a $NO_x$ removal catalyst and mixed with flue gas from the economizer, a temperature of mixed gas is increased to a predetermined temperature equal to or higher than 360° C. to have the $NO_x$ removal device in a high-temperature denitration condition, so that vanadyl sulfate ($VOSO_4$) adhering to and accumulating on the $NO_x$ removal catalyst is decomposed into vanadium pentoxide ($V_2O_5$).

Advantageously, the method of regenerating a $NO_x$ removal catalyst includes an acid washing step after the decomposing step, at which an operation of the boiler is stopped, and thereafter the $NO_x$ removal catalyst taken out from the $NO_x$ removal device is subjected to acid washing.

Advantageously, in the method of regenerating a $NO_x$ removal catalyst, in a boiler operation period at the decomposing step, fuel is changed to oil fuel with a low sulfur (S) content and is burned in the boiler.

Advantageously, in the method of regenerating a $NO_x$ removal catalyst, acid used at the acid washing step is any aqueous solution of oxalic acid, hydrochloric acid, and sulfuric acid.

Advantageously, the method of regenerating a $NO_x$ removal catalyst includes a water washing step of performing finish water washing and a drying step after the acid washing step.

Advantageously, in the method of regenerating a $NO_x$ removal catalyst, oil fuel with a low sulfur (S) content is oil fuel that contains 1% by weight or less of sulfur (S).

According to another aspect of the present invention, in a method of operating a heavy-oil fired combustion apparatus that burns heavy oil in a boiler, at an operating step before shutdown of a boiler, a part of combustion gas that has bypassed an economizer provided in a flue gas duct for flue gas from the boiler is supplied to an upstream of a $NO_x$ removal device and mixed with flue gas from the economizer, a temperature of mixed gas is increased to a predetermined temperature equal to or higher than 360° C., which is higher than a normal operating temperature condition, to have the $NO_x$ removal device in a high-temperature denitration condition, so that nitrogen oxide in flue gas is removed during an operation of the $NO_x$ removal device, and vanadyl sulfate ($VOSO_4$) adhered and accumulated on a $NO_x$ removal catalyst is decomposed into vanadium pentoxide ($V_2O_5$), and sulfur oxide ($SO_x$) produced at a time of decomposing vanadyl sulfate ($VOSO_4$) into vanadium pentoxide ($V_2O_5$) at the operating step before shutdown is treated in an air pollution control facility on a downstream side of the $NO_x$ removal device.

Advantageously, in the method of operating a heavy-oil fired combustion apparatus, at a time of a normal operation, combustion is performed in the boiler by using heavy oil with a high sulfur (S) content, and before predetermined shutdown for a boiler inspection, fuel is changed to oil fuel with a low sulfur (S) content and burned in the boiler.

Advantageously, in the method of operating a heavy-oil fired combustion apparatus, a temperature of flue gas from an economizer outlet at a normal operating step is set equal to or higher than 360° C., and a temperature of the mixed gas is set equal to or higher than 450° C.

Advantageously, in the method of operating a heavy-oil fired combustion apparatus, the oil fuel with a low sulfur (S) content is oil fuel that contains 1% by weight or less of sulfur (S).

Advantageous Effects of Invention

According to the present invention, at the time of recovering a $NO_x$ removal performance of a $NO_x$ removal catalyst used for removing $NO_x$ from flue gas discharged from a boiler in which combustion is performed by using heavy oil with a high sulfur (S) content, removal of $NO_x$ can be easily performed by using an air pollution control device of a boiler facility.

DESCRIPTION OF EMBODIMENTS

The present invention will be explained below in detail with reference to the accompanying drawings. The present invention is not limited the following embodiments, and configurations achieved by combining these embodiments are also included in the present invention. In addition, constituent elements in the following embodiments include those that can be easily anticipated by persons skilled in the art or that are substantially equivalent.

Embodiment

A method of regenerating a $NO_x$ removal catalyst and a method of operating a heavy-oil fired combustion apparatus according to an embodiment of the present invention will be explained below with reference to the drawings.

Figure 1:
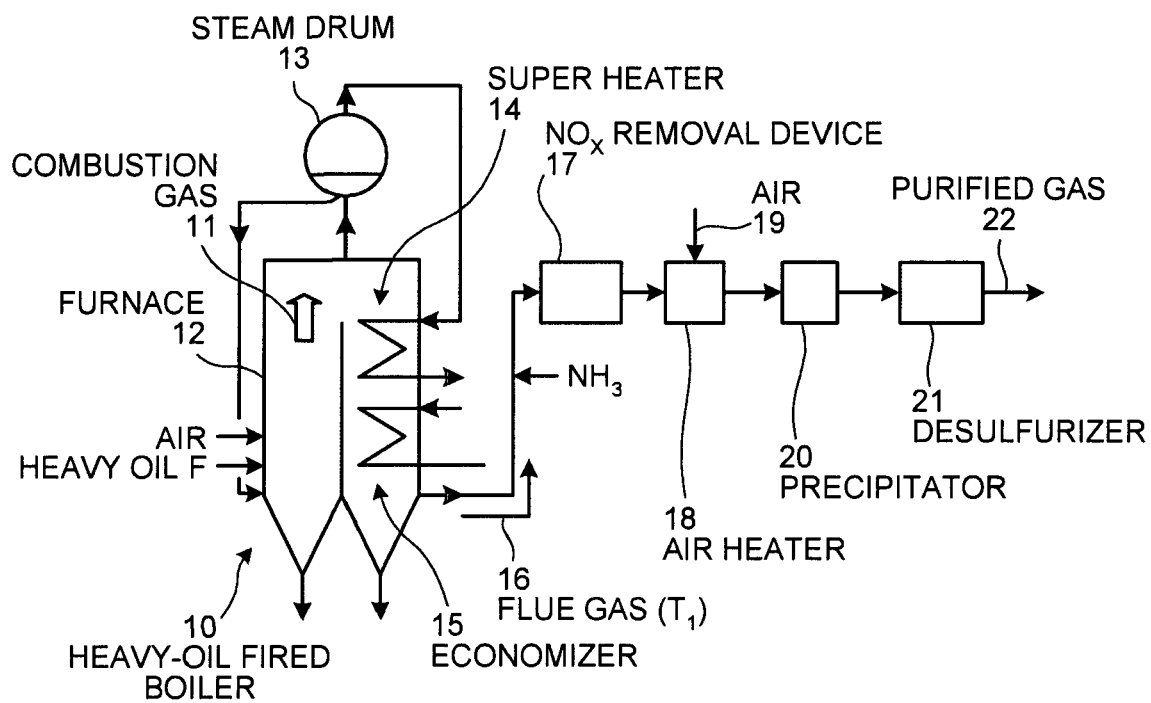
FIG. 1 is a schematic diagram of an air pollution control device of a heavy-oil fired boiler.

FIG. 1 is a schematic diagram of an air pollution control device of a heavy-oil fired boiler. As shown in FIG. 1, combustion gas 11 in a heavy-oil fired boiler 10 that uses heavy oil F generates steam in a steam generating tube in a furnace 12 (the generated steam is vapor-liquid separated in a steam drum 13, guided to a super heater 14 to become superheated steam, which is then used for driving a steam turbine, and thereafter condensed water is refluxed to a water tube in the furnace 12 and re-evaporated), and the steam is heated by the super heater 14. The combustion gas 11 then heats feed water to the heavy-oil fired boiler 10 in an economizer 15, and is discharged from an outlet of the economizer 15 as flue gas 16. The flue gas 16 discharged from the economizer 15 is supplied to a $NO_x$ removal device 17 that removes nitrogen oxide ($NO_x$) in flue gas, heats air 19 by heat exchange in an air heater 18, and is then supplied to a precipitator 20. The flue gas 16 is also supplied to a desulfurizer 21 that desulfurizes sulfur oxide ($SO_x$) in the flue gas, and then discharged to the atmosphere as purified gas 22.

As the $NO_x$ removal device 17, a device that performs catalytic reduction of $NO_x$ in the flue gas 16 from the heavy-oil fired boiler 10 by spraying ammonium ($NH_3$) to a downstream side of the $NO_x$ removal device (a catalytic portion) 17 has been proposed.

Figure 2:
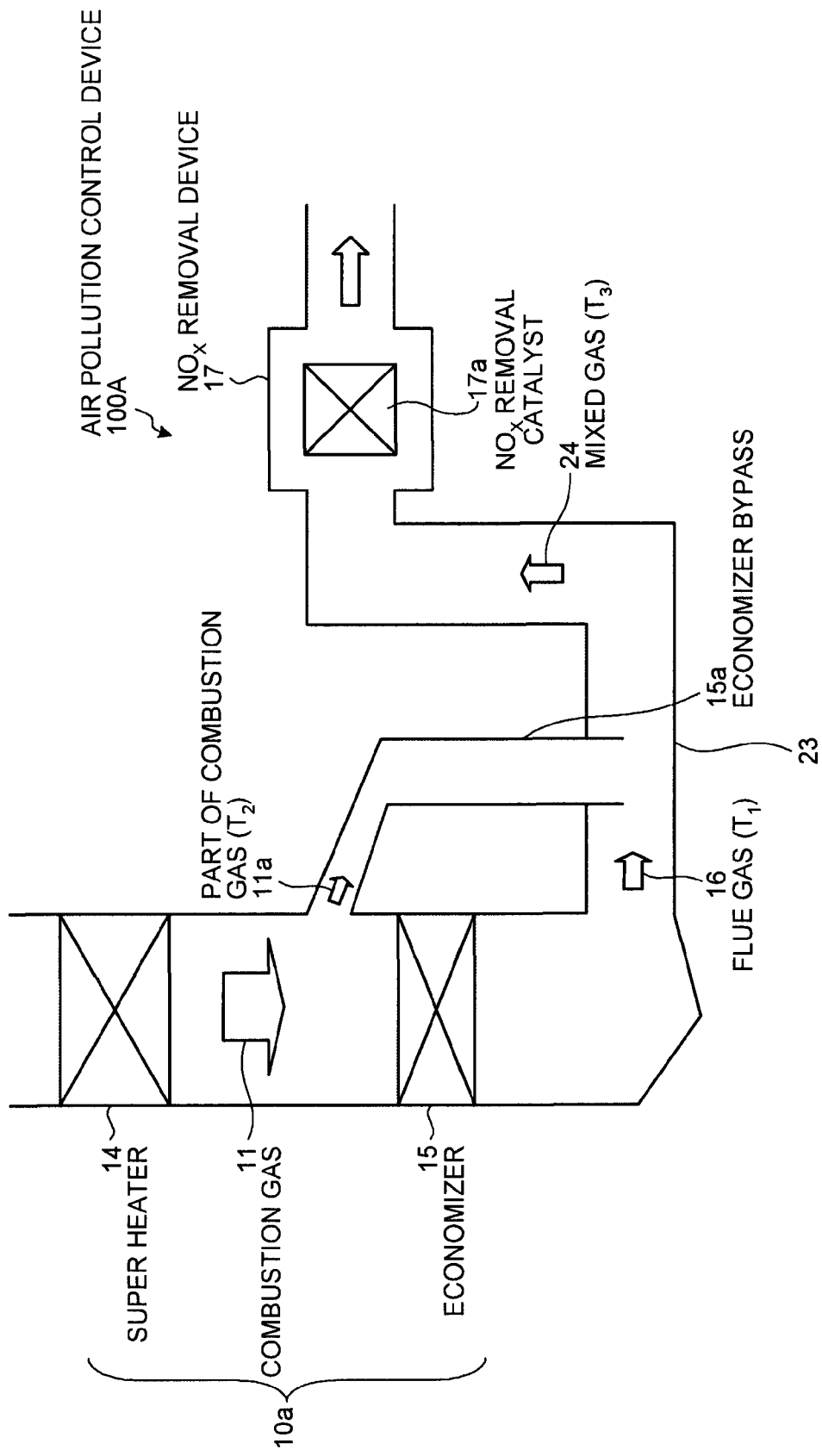
FIG. 2 is a schematic diagram of a heat exchanger including an economizer and a $NO_x$ removal device.

FIG. 2 is a schematic diagram of a heat exchanger including the economizer and the $NO_x$ removal device.

As shown in FIG. 2, the economizer 15 is provided in the last stage of a heat exchanger 10a, and an economizer bypass 15a for bypassing the economizer 15 is connected to a flue gas duct 23 for discharging the flue gas 16. A part 11a of combustion gas flowing into the economizer bypass 15a is mixed with the flue gas 16 discharged from the economizer 15, which can be supplied as mixed gas 24 to the $NO_x$ removal device 17 including a $NO_x$ removal catalyst 17a. On an upstream side of the $NO_x$ removal device 17, ammonia is sprayed to perform denitration by ammonia.

Because the part 11a of combustion gas bypassing the economizer 15 through the economizer bypass 15a is not used for heat exchange in the economizer 15, a gas temperature ($T_2$) thereof is as high as, for example, 550° C. to 600° C., although depending on an operating condition of the boiler.

At the time of a normal operation, a part of flue gas can be set not to flow into the economizer bypass 15a by a shutoff valve (not shown).

A temperature ($T_1$) of the flue gas 16 at the outlet of the economizer 15 is about 350° C. to 360° C. because heat exchange is performed.

Accordingly, a temperature ($T_3$) of the mixed gas 24 in which the flue gas 16 at the outlet of the economizer 15 having a gas temperature ($T_1$) and a part of bypassed combustion gas having the gas temperature ($T_2$) are mixed can be equal to or higher than 360° C., which is higher than the temperature ($T_1$) of the flue gas 16 at the outlet of the economizer 15, by adjusting a bypassed amount of the part 11a of combustion gas.

Meanwhile, when heavy oil is burned in the boiler as described above, because a large amount of vanadium component is contained in the heavy oil, the vanadium component approaches the $NO_x$ removal catalyst 17a used in the $NO_x$ removal device 17 of the air pollution control device, in a state of vanadium pentoxide ($V_2O_5$). However, once adhering to the $NO_x$ removal catalyst 17a, the vanadium component reacts with sulfur dioxide ($SO_2$) and sulfur trioxide ($SO_3$) contained in the flue gas 16 as shown in the following reaction formula (2), and accumulates on the $NO_x$ removal catalyst 17a in a state of vanadyl sulfate ($VOSO_4$). Accumulation of vanadyl sulfate ($VOSO_4$) becomes noticeable, when a contained amount of sulfur (S) is 1% by weight or more, although depending on a contained amount of sulfur (S) in heavy oil.

$$V_2O_5 + SO_2 + SO_3 \rightarrow 2VOSO_4 \qquad (2)$$

<Method of Regenerating $NO_x$ Removal Catalyst>

The present invention provides a method of regenerating a $NO_x$ removal catalyst in which vanadyl sulfate ($VOSO_4$) accumulating on a surface of the $NO_x$ removal catalyst is removed and regenerated, at the time of burning heavy oil in a boiler.

The method of regenerating the $NO_x$ removal catalyst according to the present invention includes the following processes.

1) Decomposing Process of $VOSO_4$ During Boiler Operation

In a pretreatment process during an operation of the boiler, the part 11a of the flue gas 16 from the boiler 10, which has bypassed the economizer provided in the flue gas duct 23, is supplied to an upstream of the $NO_x$ removal device including a $NO_x$ removal catalyst, and is mixed with flue gas from the economizer in a predetermined period of time before shutdown. The temperature of the mixed gas ($T_3$) is increased to a predetermined temperature equal to or higher than 360° C. (360° C. to 450° C.) to have the $NO_x$ removal device in a high-temperature denitration condition, so that vanadyl sulfate ($VOSO_4$) adhering to and accumulating on the $NO_x$ removal catalyst is decomposed into vanadium pentoxide ($V_2O_5$).

1) In the pretreatment process during a boiler operation, vanadyl sulfate ($VOSO_4$) adhering to and accumulating on the $NO_x$ removal catalyst is decomposed into vanadium pentoxide ($V_2O_5$), and the state of a vanadium component remaining in the $NO_x$ removal catalyst is changed to vanadium pentoxide ($V_2O_5$), which can be removed by washing with oxalic acid.

Therefore, in the present embodiment, after oil is changed from normal heavy oil with a high sulfur (S) content to oil fuel with a low sulfur (S) content, the part 11a of combustion gas is introduced into the economizer bypass 15a. However, the kind of fuel can be changed after the part 11a of combustion gas is introduced.

In a predetermined period of time before shutdown of the boiler, combustion in the boiler can be performed by changing boiler fuel from a type of fuel having a high sulfur (S) content to oil fuel having a low-sulfur (S) content. Accordingly, decomposition of vanadyl sulfate (VOSO$_4$) can be promoted.

2) Acid Washing Process

After finishing the pretreatment process during the boiler operation in 1), the boiler is shutdown, the NO$_x$ removal catalyst 17a is taken out from the NO$_x$ removal device 17, the taken out NO$_x$ removal catalyst 17a is subjected to acid washing treatment, thereby dissolving and removing vanadium pentoxide (V$_2$O$_5$), which is the remaining vanadium component.

As an acid used for dissolving and removing vanadium pentoxide (V$_2$O$_5$), for example, any aqueous solution of oxalic acid, hydrochloric acid, and sulfuric acid can be used.

After the acid treatment, the NO$_x$ removal catalyst 17a can be subjected to finish water washing, as required, to remove remaining acid from the NO$_x$ removal catalyst 17a and is dried.

Vanadium pentoxide (V$_2$O$_5$) can be dissolved and removed by using an aqueous solution other than an acidic aqueous solution. This is because when water is used, the sulfur (S) content having deposited in the catalyst dissolves and becomes an acidic aqueous solution.

The catalyst having been subjected to acid washing or finish washing is dried and is used as a regenerated NO$_x$ removal catalyst.

In the present invention, the part 11a of flue gas having the gas temperature (T$_2$), which has bypassed the economizer 15 provided in the flue gas duct for the flue gas 16 from the heavy-oil fired boiler 10, is supplied to the upstream of the NO$_x$ removal device 17 and mixed with the flue gas 16 from the economizer 15. The temperature (T$_3$) of the mixed gas 24 is increased to a temperature (360° C. to 450° C.) that is higher than the temperature (T$_1$) of flue gas under the normal operating temperature condition, and the mixed gas 24 at a high temperature is supplied to the NO$_x$ removal device 17 to set the denitration condition to a high temperature condition.

Accordingly, during the boiler operation, nitrogen oxide in the flue gas 16 can be removed by denitration by ammonia by using the NO$_x$ removal device 17, and vanadyl sulfate (VOSO$_4$) adhering to and accumulating on the NO$_x$ removal catalyst 17a can be decomposed by heating into vanadium pentoxide (V$_2$O$_5$).

Sulfur oxide (SO$_x$) such as sulfur dioxide (SO$_2$) and sulfur trioxide (SO$_3$) shown in the formula (1) produced at the time of decomposing vanadium can be treated in the existing precipitator 20 and desulfurizer 21 in the boiler facility.

$$2VOSO_4 \rightarrow V_2O_5 + SO_2 + SO_3 \quad (1)$$

As a result, it is possible to save the time and labor required for taking out the NO$_x$ removal catalyst 17a to outside and heating it under a high temperature condition from 450° C. to 600° C. in a separately provided electric furnace after the boiler operation is finished, at the time of regenerating the NO$_x$ removal catalyst 17a in a conventional manner.

Further, it can be avoided to perform decomposition of vanadyl sulfate (VOSO$_4$) under severe conditions as in conventional methods using sulfuric acid or hydrochloric acid at a high temperature.

When conventional heating treatment is performed in an electric furnace, because the heating treatment is performed in the air, sulfur dioxide (SO$_2$) and sulfur trioxide (SO$_3$) hardly exist in processing gas. However, according to the present invention, it is preferable to decrease a proportion of sulfur dioxide (SO$_2$) and sulfur trioxide (SO$_3$) contained in the flue gas 16 during combustion in the boiler, in order to promote decomposition of vanadyl sulfate (VOSO$_4$) at the time of decomposing vanadyl sulfate (VOSO$_4$) into vanadium pentoxide (V$_2$O$_5$) in the NO$_x$ removal device 17.

Therefore, in the pretreatment process during the boiler operation, fuel to be supplied to the boiler needs to be changed from inexpensive heavy oil with a high sulfur (S) content to sulfur (S) fuel having a low content ratio of sulfur (S).

The heavy oil having a high content ratio of sulfur is, for example, ultraheavy oil with a sulfur (S) content of 1% by weight or more, such as Orimulsion, asphalt, or vacuum residual oil (VRO).

The sulfur (S) fuel having a low content ratio of sulfur (S) used at the time of changing the fuel at the pretreatment process during the boiler operation is not such ultraheavy oil, but is essentially oil fuel with a sulfur (S) content of less than 1% by weight.

More preferably, so-called LSA heavy oil (low sulfur A fuel oil) with a sulfur (S) content of 0.5% by weight or less can be used.

This is because when the content of sulfur in flue gas is high, amounts of sulfur dioxide (SO$_2$) and sulfur trioxide (SO$_3$) produced by a reaction in the formula (1) decrease, and expensive low-sulfur (S) fuel is used for a long time, which is not desirable.

Even if the content of sulfur in oil fuel exceeds 1% by weight, when the SO$_x$ concentration in the flue gas 16 before being introduced into the NO$_x$ removal device 17 is equal to or lower than 2000 parts per million, volumetric dry (ppmvd), according to boiler combustion conditions, oil fuel having a content rate of sulfur (S), which is slightly lower than that of normally used low-grade fuel having a high content ratio of sulfur, can be used.

This is because when the SO$_x$ concentration in the flue gas 16 before being introduced into the NO$_x$ removal device 17 exceeds 2000 ppmvd, the concentration of produced SO$_x$ is increased and imposes a burden on an air pollution control facility on a downstream side, which is not desirable.

When the SO$_x$ concentration in the flue gas before being introduced into the NO$_x$ removal device 17 is set to 1000 ppmvd or lower, more preferably, set to 500 ppmvd or lower, it does not impose a burden on the air pollution control facility.

By performing the pretreatment before shutdown of the boiler in 1), the temperature of the mixed gas 24 to be introduced into the NO$_x$ removal device 17 is increased during the boiler operation, and vanadyl sulfate (VOSO$_4$) deposited on the NO$_x$ removal catalyst 17a can be decomposed into vanadium pentoxide (V$_2$O$_5$) having solubility in an aqueous solution of oxalic acid.

Thereafter, the boiler is shut down, the NO$_x$ removal catalyst 17a is extracted and washed with acid by using, for example, an aqueous solution of oxalic acid, thereby removing vanadium pentoxide (V$_2$O$_5$) produced in the NO$_x$ removal catalyst.

The acid washing process is a process of removing compounds such as alkali metal (such as Na and K), alkali earth metal (such as Ca and Mg), and vanadium pentoxide (V$_2$O$_5$) with its state changed by heating treatment from the NO$_x$ removal catalyst by dissolving these compounds in, for example, an aqueous solution of oxalic acid.

At this time, the concentration of oxalic acid in the aqueous solution of oxalic acid is preferably from 0.5% by weight to 25% by weight (more preferably, from 4% by weight to 20% by weight). This is because if the concentration of oxalic acid is lower than 0.5% by weight, the vanadium component ($V_2O_5$) and the like cannot be sufficiently removed by washing, and if the concentration thereof exceeds 25% by weight, the cost required for treatment is increased.

The temperature of the aqueous solution of oxalic acid is preferably from 20° C. to 80° C. This is because if the temperature of the aqueous solution of oxalic acid is lower than 20° C., vanadium pentoxide ($V_2O_5$) and the like cannot be sufficiently removed by washing, and if the temperature thereof is higher than 80° C., the cost required for the treatment is increased.

When a finish water washing process is performed, oxalic acid adhering to and remaining on the surface of the $NO_x$ removal catalyst, along with washing using the aqueous solution of oxalic acid, is removed by washing with water.

At this time, the temperature of the water is preferably from 10° C. to 80° C. This is because if the water temperature is lower than 10° C., adhering residue cannot be sufficiently dissolved in the water and removed, and if the water temperature is higher than 80° C., it is wasteful in view of thermal energy.

As described above, according to the present invention, when combustion is performed in a boiler by using heavy oil with a high content of sulfur (S) (1% by weight or more), vanadyl sulfate ($VOSO_4$) adheres to and accumulates on the surface of the $NO_x$ removal catalyst during the operation of the $NO_x$ removal device 17. However, by changing fuel from heavy oil to fuel with a low sulfur (S) content (for example, LAS heavy oil with a sulfur content of 0.5% by weight or less), and causing the part 11a of combustion gas 11 to bypass the economizer 15 by using the economizer bypass 15a and to be mixed with the flue gas 16 from the outlet of the economizer 15, to generate the mixed gas 24 with the temperature thereof being increased, vanadyl sulfate ($VOSO_4$) having deposited on the $NO_x$ removal catalyst can be decomposed into vanadium pentoxide ($V_2O_5$) during the boiler operation.

As a result, it is not required to perform any heating treatment process as in conventional methods, at which after shutdown of the boiler, the extracted $NO_x$ removal catalyst is heated in the separately provided electric furnace, to decompose vanadyl sulfate ($VOSO_4$) into vanadium pentoxide ($V_2O_5$).

Further, an air pollution control facility for an electric furnace separately provided for removing sulfur oxide produced in the heating treatment is not required, thereby enabling to remove the burden on the facility cost related to the regeneration treatment.

The $NO_x$ removal catalyst to which the regeneration method according to the present invention can be applied is not limited to any particular type, and includes, for example, various $NO_x$ removal catalysts such as a catalyst in which a vanadium-tungsten component is supported on titania as a carrier, a catalyst in which only a tungsten component is supported on a titania carrier, a catalyst in which a vanadium-molybdenum component is supported on a titania carrier, and a catalyst in which an active component other than the components mentioned above is supported on a titania carrier.

In addition, a carrier of titania-silica composite oxide can be used as the carrier.

Furthermore, the regeneration method according to the present invention can exhibit the effect mentioned above more remarkably, when the method is applied to a $NO_x$ removal catalyst prepared by forming titania-tungsten composite oxide, and causing a vanadium-based compound to be supported on the composite oxide as a carrier, rather than being applied to a titanium-tungsten based $NO_x$ removal catalyst prepared by forming a titania carrier beforehand, and causing a tungsten component to be supported on the titania carrier.

The composite oxide type $NO_x$ removal catalyst described above can be prepared, for example, by calcining solated metatitanic acid containing at least one compound selected from among tungsten compounds, adding an appropriate amount of an auxiliary agent and water to the resulting calcination product, or the calcination product mixed with vanadium oxide, kneading the mixture, extruding the kneaded mixture into a lattice form by an extruder, and then drying and calcining the extrudate (see, for example, Japanese Patent Publication No. H1-14808).

More specifically, the composite oxide type $NO_x$ removal catalyst described above can be easily prepared, for example, by adding a predetermined amount of an aqueous solution of ammonium paratungstate to metatitanic acid, dehydrating, molding, and drying the mixture, and then calcining the resulting material; or by adding a predetermined amount of an aqueous solution of ammonium paratungstate to metatitanic acid, dehydrating and drying the mixture, then impregnating the resulting material with an aqueous solution of ammonium metavanadate, molding the impregnated material, then drying and calcining the molded product.

<Method of Operating Heavy-Oil Fired Boiler>

A method of operating a heavy-oil fired boiler for regenerating a $NO_x$ removal catalyst includes the following processes.

a) Normal Operating Process

At the time of a normal operation, the heavy oil F with a high sulfur (S) content is burned in a boiler.

b) Operating Process Before Shutdown

Before shutdown of the boiler, fuel is changed to oil fuel with a low sulfur (S) content and burned in the boiler in a predetermined period of time.

In the operating process before shutdown in b), the part 11a of combustion gas having bypassed the economizer 15 provided in the flue gas duct 23 for flue gas from the boiler is supplied to the upstream of the $NO_x$ removal device 17 and mixed with the flue gas 16 from the economizer 15, to generate the mixed gas 24 having a predetermined temperature equal to or higher than 360° C. (360° C. to 450° C.), which is higher than a normal operating temperature condition. The mixed gas 24 is introduced into the $NO_x$ removal device 17 to have the $NO_x$ removal device in a high-temperature denitration condition, so that nitrogen oxide in the flue gas 16 are removed in the $NO_x$ removal device 17 during the boiler operation, and vanadyl sulfate ($VOSO_4$) adhering to and accumulating on the $NO_x$ removal catalyst 17a is decomposed into vanadium pentoxide ($V_2O_5$). Furthermore, $SO_x$ produced at the time of decomposing vanadium pentoxide ($V_2O_5$) at the operating process before shutdown can be treated in the desulfurizer 21 of the air pollution control facility on the upstream side of the $NO_x$ removal device 17.

Shutdown of the boiler includes emergency shutdown in addition to that for a periodic inspection.

In the normal operating process in a), the boiler is operated under a high temperature condition in which the temperature of the flue gas 16 from the economizer 15 is equal to or higher than 400° C., thereby enabling to reduce a produced amount of vanadyl sulfate ($VOSO_4$) adhering to and accumulating on the $NO_x$ removal catalyst 17a. This is because the reaction according to the formula (2) described above does not proceed under the high temperature condition, and accumulation of vanadyl sulfate ($VOSO_4$) on the $NO_x$ removal catalyst is decreased.

Accordingly, in the normal operating process in a), the produced amount of vanadyl sulfate ($VOSO_4$) adhering to and accumulating on the $NO_x$ removal catalyst 17a can be reduced by setting a high temperature operating condition (operated at a high temperature ($T_1$=360° C. to 400° C.) higher than the normal operating temperature ($T_1$=350° C. of the flue gas 16).

As a result, the combustion time for decomposing vanadyl sulfate ($VOSO_4$) with low S content fuel by using the mixed gas of equal to or lower than 450° C., which is mixed with flue gas from the economizer bypass, in the operating process before shutdown in b) can be reduced.

Consequently, fuel use of the low S content fuel having a fuel unit price higher than that of heavy oil, which is used at the time of heating and decomposing vanadyl sulfate ($VOSO_4$) adhering to and accumulating on the $NO_x$ removal catalyst 17a, can be reduced.

For example, in the normal operating process, if it is assumed that operation hours before shutdown in a case where the boiler is operated at a temperature of the flue gas 16 from the economizer 15 from 350° C. to 380° C. are, for example, five to seven days, the operation hours can be reduced to, for example, three to four days by setting the temperature ($T_1$) of the flue gas 16 from the economizer 15 equal to or higher than 400° C. and the temperature ($T_3$) of the mixed gas mixed with flue gas from the economizer bypass equal to or higher than 450° C.

The operating process before shutdown in b) is identical to the "pretreatment process during the boiler operation" in the method of regenerating the $NO_x$ removal catalyst described above, and therefore detailed explanations thereof will be omitted.

According to the method of operating the heavy-oil fired boiler of the present invention, the pretreatment for regenerating the $NO_x$ removal catalyst can be performed during a boiler operation, and thus high temperature heating treatment by using a separately provided electric furnace as in conventional methods is not required, and treatment of sulfur oxide ($SO_x$) produced at the time of performing the treatment is not required, thereby enabling to simplify regeneration of the $NO_x$ removal catalyst.

Test Example

As a used $NO_x$ removal catalyst, a used $NO_x$ removal catalyst in which vanadyl sulfate ($VOSO_4$) was deposited on a surface thereof (a honeycomb catalyst with 6 holes×7 holes× 900 millimeters) was prepared.

Simulant gas (with the $SO_2$ concentration in the gas simulating flue gas of a low sulfur (S) fuel being 500 ppmvd) under the following conditions in Table 2 was introduced into the used $NO_x$ removal catalyst, and $SO_3$ in the gas at the outlet of the catalyst was measured over time, thereby confirming decomposition of vanadyl sulfate ($VOSO_4$) in flue gas of the low sulfur (S) fuel.

X-ray diffraction patterns before and after finishing the test were measured.

TABLE 2

| Gas condition | | |
|---|---|---|
| Gas temperature | C.° | 367 |
| Gas flow rate | Nm3/hr | 15.43 |
| $SO_2$ at Inlet | ppmvd | 500 |
| $SO_3$ at Inlet | ppmvd | 10 |
| $O_2$ | % vd | 2 |
| $H_2O$ | % v | 13.2 |
| Ugs | Nm/sec | 2 |

TABLE 2-continued

Figure 3:
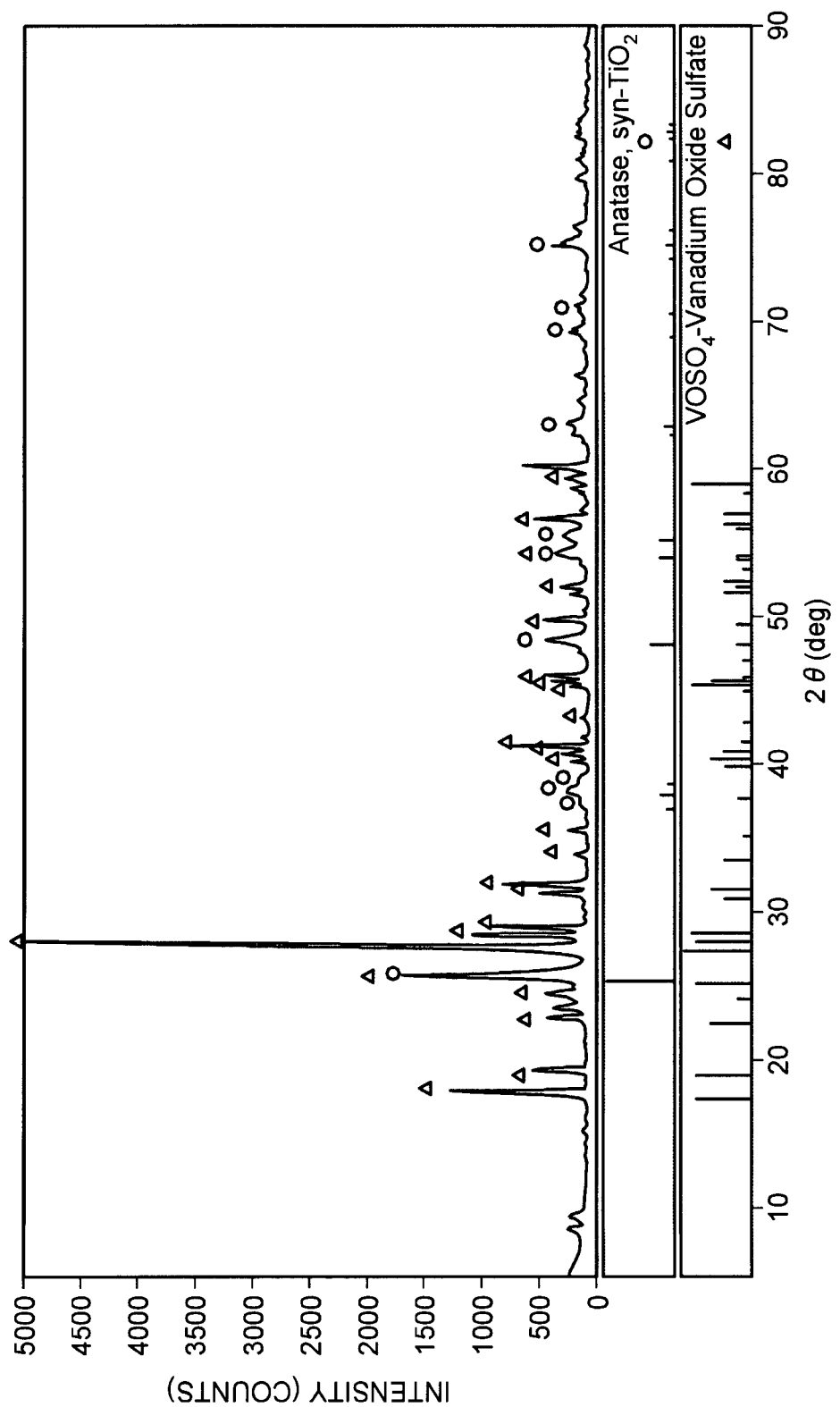
FIG. 3 depicts an X-ray diffraction pattern before heating and regeneration.
Figure 4:
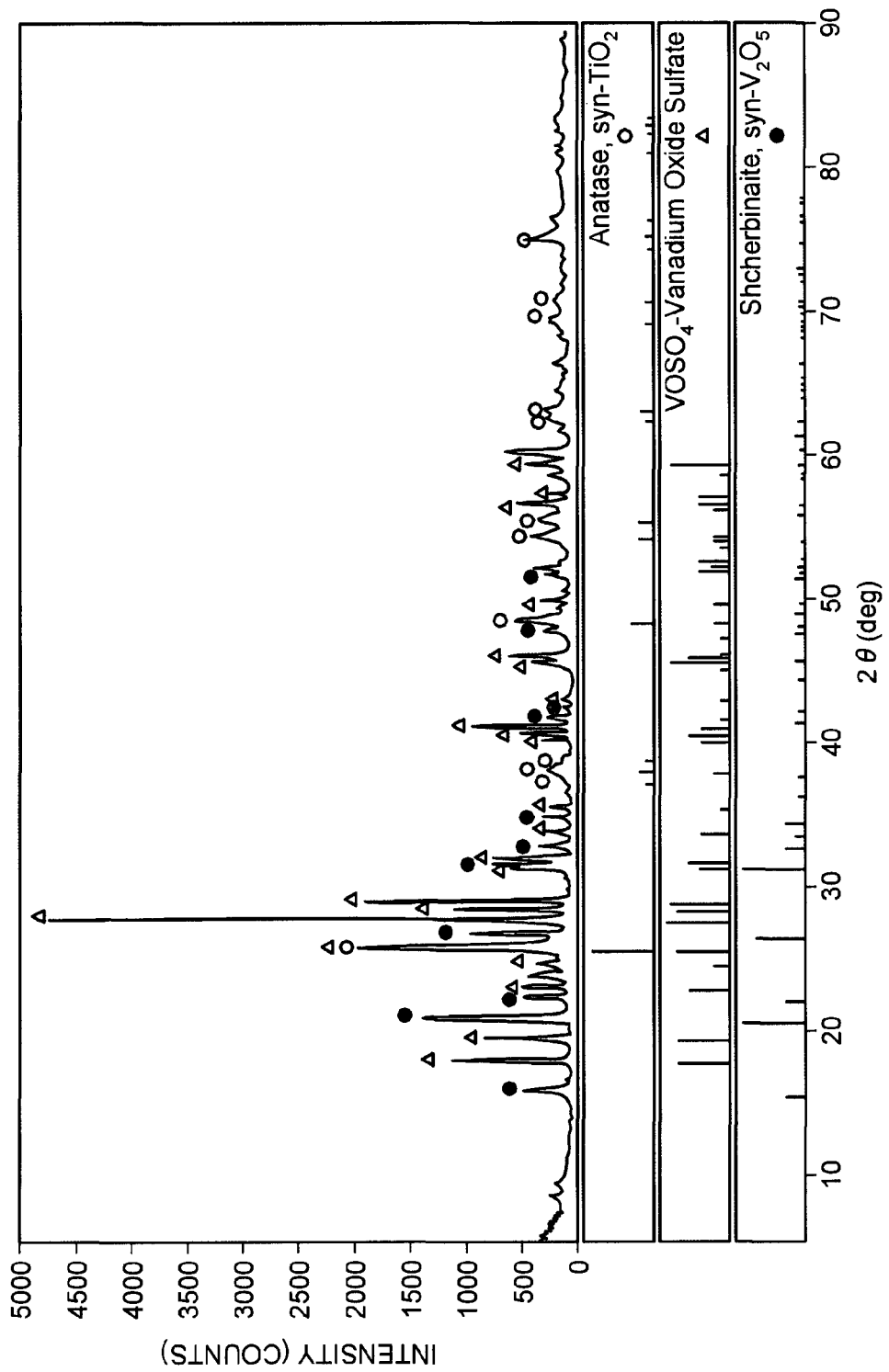
FIG. 4 depicts an X-ray diffraction pattern after performing heating treatment with gas containing $SO_2$ and $SO_3$.
Figure 5:
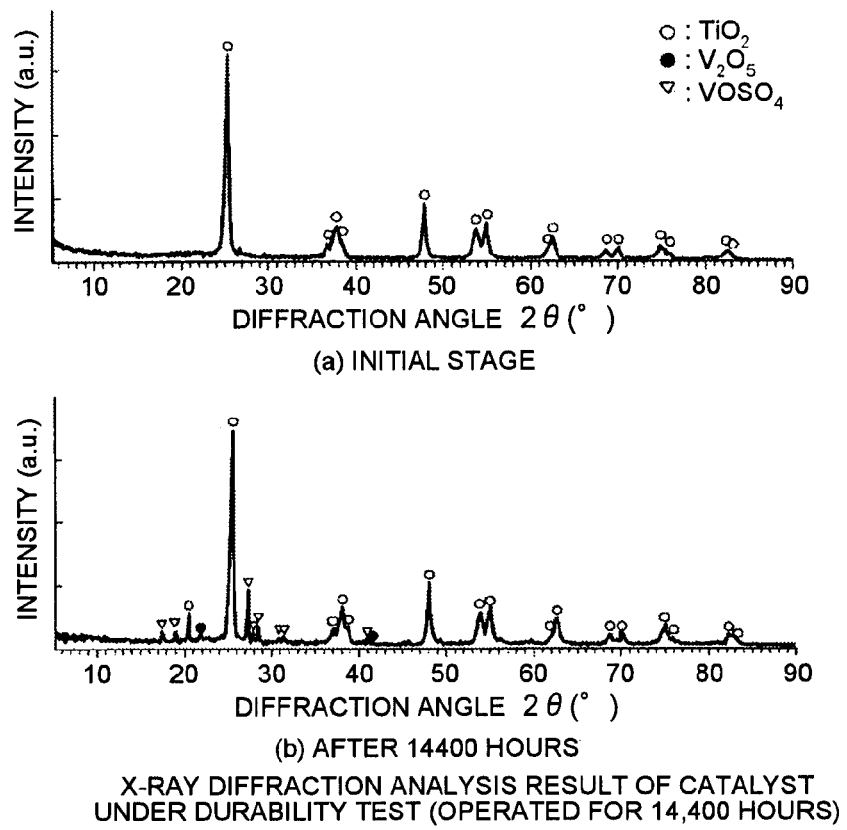
FIG. 5 is a graph of an X-ray diffraction analysis result of a $NO_x$ removal catalyst after being operated for 14,400 hours.
Figure 6:
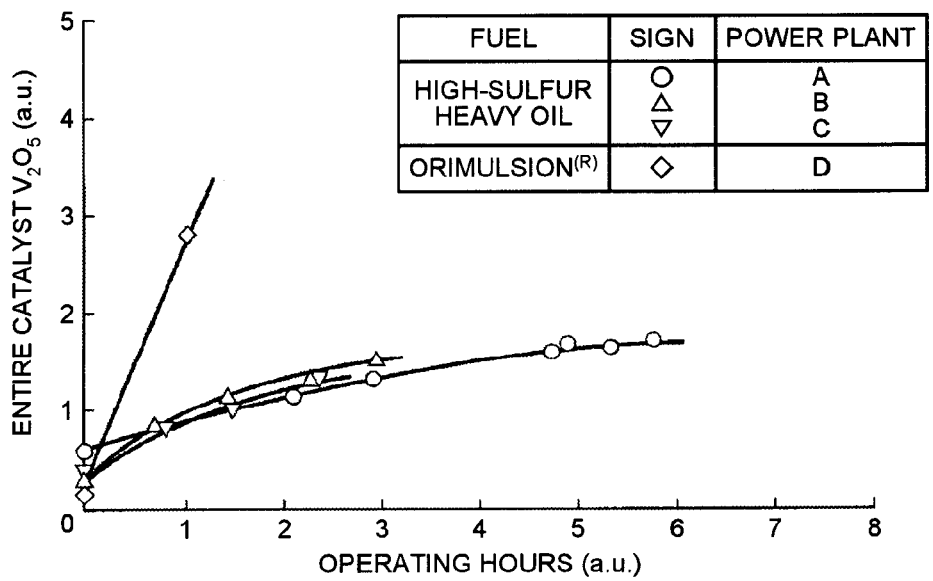
FIG. 6 is a graph of a relation between a boiler operating time and an increased amount of vanadium pentoxide ($V_2O_5$) in an entire catalyst.
Figure 7:
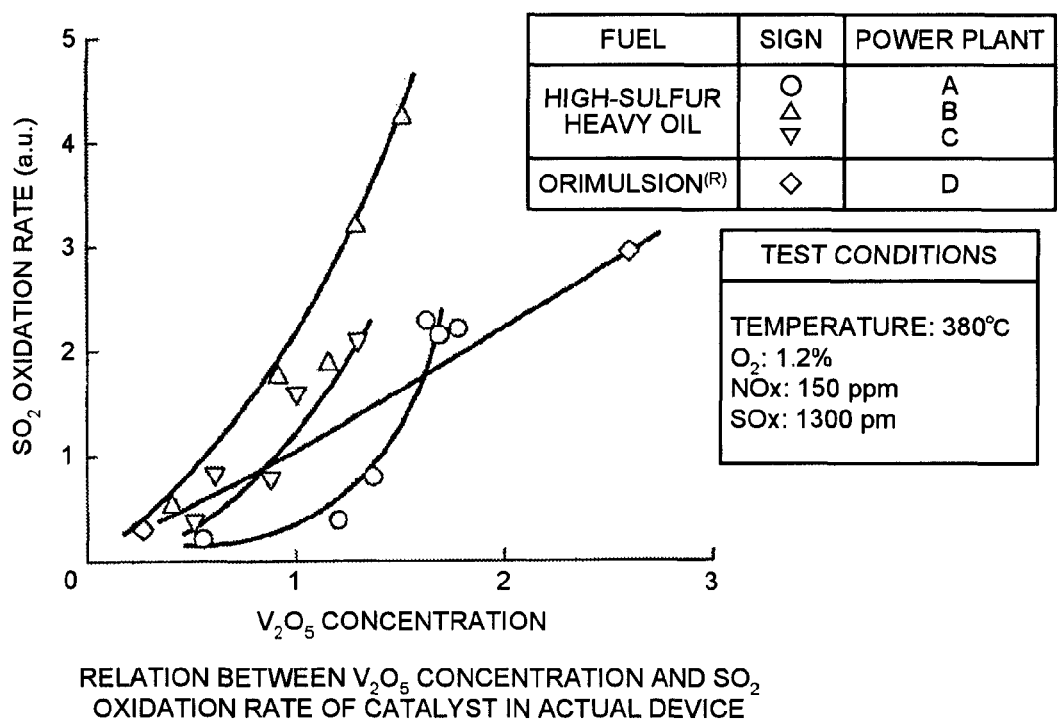
FIG. 7 is a graph of a relation between a concentration increase of vanadium pentoxide ($V_2O_5$) and an $SO_2$ oxidation rate.

FIG. 3 depicts an X-ray diffraction pattern before heating and regeneration. FIG. 4 depicts an X-ray diffraction pattern after performing heating treatment with gas containing $SO_2$ and $SO_3$.

As shown in FIGS. 3 and 4, in the X-ray diffraction pattern shown in FIG. 4, vanadium pentoxide ($V_2O_5$), which was a decomposition product of vanadyl sulfate ($VOSO_4$), was confirmed, and it was confirmed that even under gas conditions containing sulfur oxide, vanadyl sulfate ($VOSO_4$) was sufficiently decomposed into vanadium pentoxide ($V_2O_5$).

REFERENCE SIGNS LIST 10 heavy-oil fired boiler
11 combustion gas
11a part of combustion gas
12 furnace
13 steam drum
14 super heater
15 economizer
15a economizer bypass
16 flue gas
17 $NO_x$ removal device
20 precipitator
21 desulfurizer
22 purified gas
23 flue gas duct
24 mixed gas

The invention claimed is:

1. A method of regenerating a $NO_x$ removal catalyst for removing nitrogen oxide in flue gas at a time of combustion in a boiler by using heavy oil, wherein
   in a predetermined period of time before shutdown of a boiler, a decomposing step is performed during an operation of the boiler, at which a part of combustion gas that has bypassed an economizer provided in a flue gas duct for flue gas from the boiler is supplied to an upstream of a $NO_x$ removal device having a $NO_x$ removal catalyst and mixed with flue gas from the economizer, a temperature of mixed gas is increased to a predetermined temperature equal to or higher than 360° C. to have the $NO_x$ removal device in a high-temperature denitration condition, so that vanadyl sulfate ($VOSO_4$) adhering to and accumulating on the $NO_x$ removal catalyst is decomposed into vanadium pentoxide ($V_2O_5$).

2. The method of regenerating a $NO_x$ removal catalyst according to claim 1, comprising an acid washing step after the decomposing step, at which an operation of the boiler is stopped, and thereafter the $NO_x$ removal catalyst taken out from the $NO_x$ removal device is subjected to acid washing.

3. The method of regenerating a $NO_x$ removal catalyst according to claim 1, wherein in a boiler operation period at the decomposing step, fuel is changed to oil fuel with a low sulfur (S) content and is burned in the boiler.

4. The method of regenerating a $NO_x$ removal catalyst according to claim 2, wherein acid used at the acid washing step is any aqueous solution of oxalic acid, hydrochloric acid, and sulfuric acid.

5. The method of regenerating a $NO_x$ removal catalyst according to claim 2, comprising a water washing step of performing finish water washing and a drying step after the acid washing step.

6. The method of regenerating a $NO_x$ removal catalyst according to claim 3, wherein oil fuel with a low sulfur (S) content is oil fuel that contains 1% by weight or less of sulfur (S).

7. The method of regenerating a $NO_x$ removal catalyst according to claim 2, wherein in a boiler operation period at the decomposing step, fuel is changed to oil fuel with a low sulfur (S) content and is burned in the boiler.

8. The method of regenerating a $NO_x$ removal catalyst according to claim 4, comprising a water washing step of performing finish water washing and a drying step after the acid washing step.

* * * * *